(12) United States Patent
Otake (10) Patent No.: US 8,417,428 B2
(45) Date of Patent: Apr. 9, 2013

(54) ALTERNATOR CONTROLLING APPARATUS AND ALTERNATOR CONTROLLING METHOD

(75) Inventor: Hirotada Otake, Numazu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 12/811,016

(22) PCT Filed: Dec. 8, 2008

(86) PCT No.: PCT/JP2008/072281
§ 371 (c)(1),
(2), (4) Date: Jun. 28, 2010

(87) PCT Pub. No.: WO2009/084381
PCT Pub. Date: Jul. 9, 2009

(65) Prior Publication Data
US 2010/0286857 A1    Nov. 11, 2010

(30) Foreign Application Priority Data
Dec. 28, 2007 (JP) .................................. 2007-340646

(51) Int. Cl.
*H02J 7/00* (2006.01)
(52) U.S. Cl. .......................................... 701/53; 320/132
(58) Field of Classification Search .............. 701/53, 701/54; 324/427, 430; 320/132, 134
See application file for complete search history.

(56) References Cited

U.S. PATENT DOCUMENTS

| | | | | |
|---|---|---|---|---|
| 5,280,231 A * | 1/1994 | Kato et al. | ...................... | 322/28 |
| 6,166,523 A * | 12/2000 | Singh et al. | .................. | 320/132 |
| 7,906,864 B2 * | 3/2011 | Ko | .............................. | 290/40 C |
| 8,129,996 B2 * | 3/2012 | Iwane et al. | .................. | 324/427 |
| 2006/0271257 A1 | 11/2006 | Kuroda et al. | | |
| 2007/0255477 A1 * | 11/2007 | Okuda et al. | ..................... | 701/93 |
| 2011/0054726 A1 * | 3/2011 | Noumura | ....................... | 701/22 |

FOREIGN PATENT DOCUMENTS

| | | |
|---|---|---|
| CN | 1238588 A | 12/1999 |
| CN | 1498792 A | 5/2004 |
| JP | 62 131844 | 6/1987 |
| JP | 7 46772 | 2/1995 |
| JP | 2003 61400 | 2/2003 |
| JP | 2005 51920 | 2/2005 |
| JP | 2005 57853 | 3/2005 |
| JP | 2005 348526 | 12/2005 |
| JP | 2006 335097 | 12/2006 |
| JP | 2007 9885 | 1/2007 |

\* cited by examiner

*Primary Examiner* — Joseph C Rodriguez
(74) *Attorney, Agent, or Firm* — Oblon, Spivak, McClelland, Maier & Neustadt, L.L.P.

(57) ABSTRACT

An alternator controlling method includes: performing alternator braking/driving force control such that alternator braking/driving force generated by an alternator mounted in a vehicle and applied to the vehicle is controlled based on a running state of the vehicle; calculating an SOC value based on a charge status of a battery; calculating an SOC correction value based on the alternator braking/driving force Fo; determining an accelerating/decelerating state of the vehicle; setting a target voltage based on the accelerating/decelerating state and the SOC correction value; and performing battery charging control by causing the alternator to generate electrical power based on the target voltage. This enables efficient recovery of energy produced during electrical power generation by the alternator, taking account of the alternator braking/driving force control.

9 Claims, 5 Drawing Sheets

|  | UNDER DECELER-ATION | UNDER CONSTANT TRAVEL | UNDER ACCELER-ATION |
|---|---|---|---|
| CHARGE STATUS HIGH (B≥C) | V*=MID | V*=LOW | V*=LOW |
| CHARGE STATUS MEDIUM (C>B>D) | V*=HIGH | V*=MID | V*=LOW |
| CHARGE STATUS LOW (D≥B) | V*=HIGH | V*=HIGH | V*=MID |

B: SOC CORRECTION VALUE
C: THRESHOLD VALUE
D: THRESHOLD VALUE (C>D)

ALTERNATOR CONTROLLING APPARATUS AND ALTERNATOR CONTROLLING METHOD

TECHNICAL FIELD

The present invention relates to an alternator controlling apparatus and an alternator controlling method, and more particularly, relates to an alternator controlling apparatus and an alternator controlling method that perform charging control of a battery and alternator braking/driving force control, in which an alternator braking/driving force applied to a vehicle is controlled.

BACKGROUND ART

A braking/driving force, which is a braking force generated by a brake device/a driving force generated by an engine, is applied to a usual vehicle. In this case, the engine is intended to generate great driving force (e.g., approximately 1000 N). Accordingly, the engine has difficulty in following small changes in a driving force (e.g., approximately several dozen N). It also has difficulty with the response time taken to generate the required driving force.

In a conventional technology disclosed in Patent Document 1, in order that unnecessary torque on the positive side be decreased from the actual output torque relative to target torque when jerking occurs, an automatic brake device or engine auxiliary machine is activated, thereby preventing uncomfortable driving feeling resulting from attempts to suppress jerking. That is, when controlling a braking/driving force based on a required braking/driving force in order to provide feedback, this disclosed conventional technology generates an alternator and utilizes an alternator braking/driving force applied to the vehicle. As for control of electrical power generation by an electrical power generator mounted in the vehicle, relevant technologies are disclosed in Patent Documents 2 to 5.

Patent Document 1: Japanese Patent Application Laid-open No. 2007-9885
Patent Document 2: Japanese Patent Application Laid-open No. S62-131844
Patent Document 3: Japanese Patent Application Laid-open No. 2003-61400
Patent Document 4: Japanese Patent Application Laid-open No. 2005-348526
Patent Document 5: Japanese Patent Application Laid-open No. 2005-57853

DISCLOSURE OF THE INVENTION

Problems to be Solved by the Invention

An alternator generates electrical power by means of the driving force of an engine in order to charge a battery. That is, charging control of the battery is performed by causing the alternator mounted in the vehicle to generate electrical power. However, if alternator braking/driving force control is performed while controlling charging of the battery such that the alternator braking/driving force is controlled based on the running state of the vehicle, charging control of the battery is not adequately performed, which may lead to insufficient recovery of the energy produced by electrical power generation by the alternator.

The present invention has been proposed in view of the foregoing problems. It is accordingly an object of the present invention to provide an alternator controlling apparatus and an alternator controlling method that can efficiently recover energy produced by electrical power generation by an alternator, taking account of alternator braking/driving force control.

Means for Solving Problem

In order to solve the above mentioned problem and achieve the object, an alternator controlling apparatus according to the present invention includes a charging controlling means that causes an alternator mounted in a vehicle to generate electrical power and performs charging control of a battery; an alternator braking/driving force controlling means that performs alternator braking/driving force control such that an alternator braking/driving force generated by the alternator and applied to the vehicle is controlled based on a running state of the vehicle; and an SOC value correcting means that corrects an SOC value corresponding to a charge state of the battery based on the alternator braking/driving force.

In the alternator controlling apparatus, it is preferred that the charging controlling means has a target voltage setting means that sets a target voltage in the charging control based on an accelerating/decelerating state of the vehicle and the corrected SOC value, and the charging controlling means performs the charging control based on the set target voltage.

In the alternator controlling apparatus, it is preferred that the alternator controlling apparatus further includes a battery voltage detecting means that detects a voltage of the battery, wherein the charging controlling means has a charging target current value calculating means that calculates a charging target current value based on a difference between the target voltage and the detected battery voltage, and the charging controlling means performs the charging control based on the calculated charging target current value, the alternator braking/driving force controlling means has an alternator braking/driving force setting means that sets the alternator braking/driving force based on the running state of the vehicle, and an alternator target current value calculating means that calculates an alternator target current value based on the set alternator braking/driving force, and the alternator braking/driving force controlling means performs the alternator braking/driving force control based on the calculated alternator target current value, and the SOC value correcting means corrects the SOC value based on the alternator target current value.

In the alternator controlling apparatus, it is preferred that the alternator braking/driving force controlling means has a phasing filter that performs a alternator braking/driving force control based on the alternator target current value at a timing of actually applying the alternator braking/driving force to the vehicle, and the SOC value correcting means calculates an SOC gain based on a quantity of alternator generated electrical power that corresponds to a time integral value of the alternator target current values, based on phasing carried out by the phasing filter, and corrects the SOC value based on the calculated SOC gain.

In the alternator controlling apparatus, it is preferred that the charging controlling means has an accelerating state determining means that determines an accelerating/decelerating state of the vehicle based on a sum of a braking/driving force required for the vehicle and the alternator braking/driving force.

In the alternator controlling apparatus, it is preferred that the alternator controlling apparatus further includes a current location detecting means that detects the current location of the vehicle; n alternator current detecting means that detects an alternator current value of the alternator; and storage means that stores the detected alternator current value and the current location such that the detected alternator current value and the current location are correspond to each other, wherein the braking/driving force controlling means performs the alternator braking/driving force control such that when the vehicle passes through the stored current location, the alternator current value stored corresponding to the current location is used as a target current value.

An alternator controlling method according to the present invention includes a step of performing an alternator braking/driving force control such that alternator braking/driving force generated by an alternator mounted in a vehicle and applied to the vehicle is controlled based on a running state of the vehicle; a step of calculating an SOC value based on a charge status of a battery; a step of correcting the SOC value based on the alternator braking/driving force; a step of setting a target voltage based on an accelerating/decelerating state of the vehicle and the SOC value; and performing the battery charging control such that the alternator is caused to generate electrical power based on the set target voltage.

Effect of the Invention

In the alternator controlling apparatus and the alternator controlling method according to the present invention, when performing alternator braking/driving force control while performing charging of a battery, an SOC value corresponding to the charge status of the battery is corrected based on the alternator braking/driving force. For example, where the charging control is performed based on a set target voltage, the target voltage is set based on the accelerating/decelerating state of the vehicle and on the corrected SOC value. Accordingly, even if the alternator generates an alternator braking/driving force under alternator braking/driving force control, the charging control of the battery can be performed taking account of the generated alternator braking/driving force. Accordingly, energy produced by electrical power generation by the alternator can be efficiently recovered taking account of the alternator braking/driving force control.

In addition, the SOC value is corrected based on the quantity of electrical power generated by the alternator, by means of the alternator braking/driving force that will be generated in future by the alternator through the alternator braking/driving force control. Accordingly, the corrected SOC value is a future SOC value for the vehicle, and the charging control can be performed based on the future SOC value. This yields the result that energy produced by electrical power generation by the alternator can be recovered more efficiently, taking account of the alternator braking/driving force control.

In addition, the accelerating/decelerating state of the vehicle can be determined, taking account of not only the braking/driving force required for the vehicle, but also the alternator braking/driving force that will be generated in future by the alternator under alternator braking/driving force control. This enables charging to be controlled based on the future accelerating/decelerating state of the vehicle. This yields the result that energy produced by electrical power generation by the alternator can be recovered more efficiently, taking account of the alternator braking/driving force control.

EXPLANATIONS OF LETTERS OR NUMERALS 1 vehicle
2 engine
3 alternator
4 battery
5 engine ECU
6 alternator ECU
61 charging controlling unit (charging controlling means)
61a target voltage setting unit (target voltage setting means)
61b charging target current value calculating unit (charging target current value calculating means)
61c accelerating/decelerating state determining unit (acceleration/deceleration state determining means)
62 alternator braking/driving force controlling unit
62a alternator braking/driving force setting unit (alternator braking/driving force setting means)
62b alternator target current value calculating unit (alternator target current value calculating means)
62c phasing filter unit (phasing filter)
63 SOC value calculating unit
64 SOC value correcting unit (SOC value correcting means)
65 alternator controlling unit
66 storage unit (storage means)
7 transmission
8 differential device
9 electrical load
10f front wheel
10r rear wheel
11 transmission member
12 other sensors

BEST MODES FOR CARRYING OUT THE INVENTION

Referring to the accompanying drawings, the present invention will now be described in detail. It is understood that the present invention is not limited by the embodiment described below. Also, it will be obvious to those skilled in art that the constituent elements described below include ones equivalent to or substantially the same as these constituent elements. Additionally, the embodiment will be described using, as an example, a vehicle in which only an engine is mounted as a drive source that applies a braking/driving force to the vehicle. However, the present invention is not limited thereto. The vehicle may be a hybrid vehicle consisting of the drive source of which has an engine and a motor. In the description, the braking/driving force refers to a force that includes: a driving force (i.e., positive braking/driving force) applied to a vehicle in order to drive the vehicle forward or backward, and a braking force (i.e., negative braking/driving force) that is applied to the vehicle in the direction opposite to the direction of the driving force applied to the vehicle. The driving force is mainly generated by an engine 2 whereas the braking force is mainly generated by a brake device, not illustrated.

Figure 1:
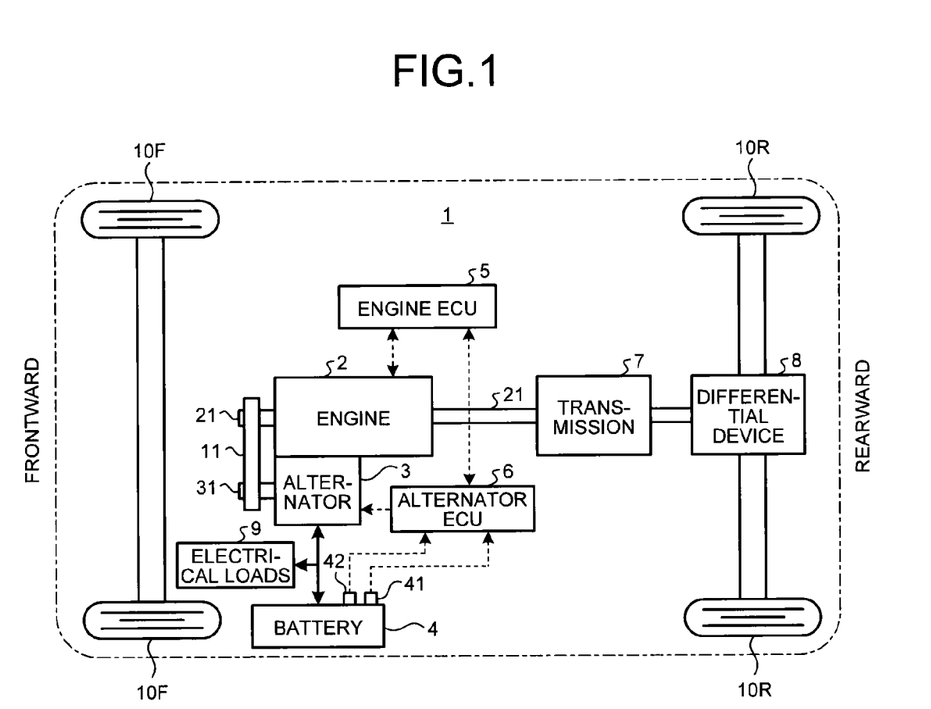
FIG. 1 is a view illustrating an example of the schematic configuration of a vehicle provided with an alternator controlling apparatus according to an embodiment.
Figure 2:
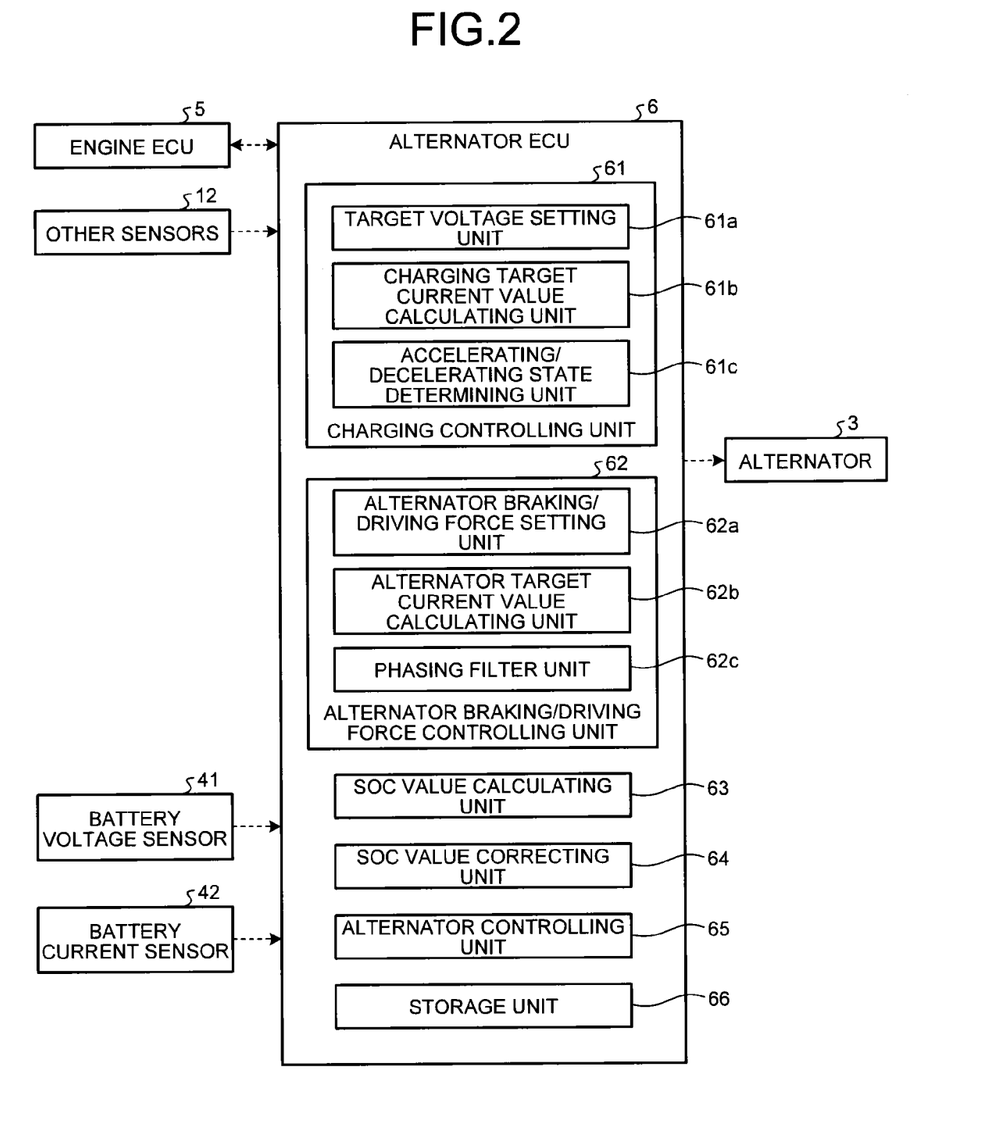
FIG. 2 is a view illustrating an example of the configuration of the alternator controlling apparatus.
Figure 3:
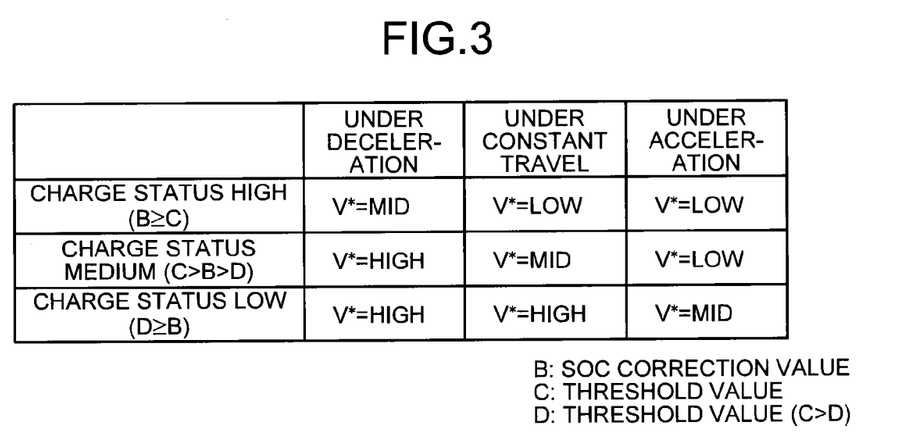
FIG. 3 is a view illustrating the relation between the accelerating/decelerating state, SOC correction, and target voltages.

FIG. 1 is a view illustrating an example of a schematic configuration of a vehicle provided with an alternator controlling apparatus according to the embodiment. FIG. 2 is a view illustrating an example of the configuration of the alternator controlling apparatus. FIG. 3 is a view illustrating the relation between the accelerating and decelerating states, SOC correction value, and target voltages. As illustrated in FIG. 1, a vehicle 1 includes an engine 2, an alternator 3, a battery 4, an engine ECU 5, and an alternator ECU 6. Reference numeral 7 represents a transmission, which, based on a transmission gear ratio, changes a braking/driving force generated by the engine 2. Reference numeral 8 represents a differential device that transmits braking/driving force generated by the engine 2 converted by the transmission 7, to wheels, namely, rear wheels 10R. Reference numeral 9 represents electrical loads such as wipers, lights, Electrical Power Steering (EPS), Variable Gear Ratio Steering (VGRS), etc, all of which are mounted on the vehicle 1. The electrical loads are activated by electrical power charged in the battery 4 or electrical power generated and supplied by the alternator 3. In addition, reference numerals 10F and 10R represent wheels that act on the vehicle 1 to transmit braking/driving force to a road surface. Here, the reference numerals 10F and 10R represent front and rear wheels, respectively. In the embodiment, the braking/driving force applied to the vehicle 1 is transmitted to a road surface via the rear wheels 10R. Reference numeral 11 represents a transmission member that connects the engine 2 and the alternator 3 and that mutually transmits the braking/driving force generated by the engine 2 and alternator braking/driving force generated by the alternator 3. For example, a belt or a chain can be used as a transmission member. Reference numeral 12 represents other sensors provided for the vehicle 1 to be used for detecting the state of the vehicle 1. These sensors are connected to the alternator ECU 6. A state of the vehicle 1 is output to the alternator ECU 6. Examples of the sensors 12 include a wheel speed sensor for detecting the speed of each wheel, not illustrated, of the vehicle 1, and a G sensor for detecting the attitude of the vehicle 1.

The engine 2 is mounted in the vehicle 1 and generates braking/driving force, and the running of the engine 2 is controlled by the engine ECU 5. The engine 2 is connected to the transmission 7 via a crankshaft 21, and the braking/driving force generated is thereby transmitted to the transmission 7. The transmission 7 is connected to the differential device 8. Braking/driving force generated by the engine 2 and transmitted therefrom is converted based on a transmission gear ratio, and the converted braking/driving force is transmitted to the differential device 8. In addition, the differential device 8 is connected to the rear wheels 10R, and the braking/driving force generated by the engine 2 and transmitted (i.e., braking/driving force converted by the transmission 7 based on the transmission gear ratio) is further transmitted to the rear wheels 10R. The engine 2 generates braking/driving force greater than the alternator braking/driving force generated by the alternator 3.

The alternator 3, which is mounted in the vehicle 1, generates electrical power by means of the braking/driving force of the engine 2. The alternator 3 applies alternator braking/driving force to the vehicle 1. The alternator 3 may be, for example, a three-phase alternating current generator provided with a rectifier, not illustrated. The alternator 3 converts power generated as AC current into DC current, and outputs the converted power. The alternator 3 is configured to generate power at optimum voltage to supply power to the electrical loads 9 and battery 4 at the most frequently used revolving speed of the engine 2. The alternator 3 includes a rotor 31 and a stator, not illustrated. The rotor 31 is connected to the crankshaft 21 of the engine 2 via the transmission member 11. Accordingly, the alternator 3 generates power to transmit the braking/driving force of the engine 2 to the rotor 31 via the transmission member 11 and the rotor 31 rotates with respect to the stator. The alternator 3 increases or decreases load produced by the generation of power, and thereby produces alternator braking/driving force. For example, by decreasing the present load of the alternator 3 while the braking/driving force of the engine 2 is constant, the braking/driving force applied to the rear wheels 10R via the transmission 7 and the differential device 8 increases. Specifically, the alternator 3 generates alternator braking/driving force. In this case, it generates alternator driving force (i.e., positive braking/driving force). Conversely, for example, by increasing the present load of the alternator 3 while the braking/driving force of the engine 2 is constant, the braking/driving force applied to the rear wheels 10R via the transmission 7 and the differential device 8 decreases. Specifically, the alternator 3 generates alternator braking/driving force. In this case, it generates alternator braking force (i.e., negative braking/driving force). Specifically, a braking/driving force resulting from the subtraction of the alternator braking/driving force generated by the alternator 3 from the braking/driving force generated by the engine 2 acts on the rear wheels 10R.

The alternator 3 is connected to the alternator ECU 6. The alternator ECU 6 performs the charging control of the battery 4, thereby controlling electrical power generation of the alternator 3. Consequently, generated alternator braking/driving force is controlled through the alternator braking/driving force control performed by the alternator ECU 6.

The battery 4, which is an electrical storage device, is connected to the alternator 3 and the electrical loads 9. The battery 4, which is composed of a secondary battery of rated voltage, accumulates electrical power generated by the alternator 3. The battery 4 is provided with a battery voltage sensor 41. The battery voltage sensor 41, which is a battery voltage detecting means, detects the present battery voltage Vr(V) of the battery 4. The battery voltage sensor 41 is connected to the alternator ECU 6, and a battery voltage Vr thus detected is output to the alternator ECU 6. In addition, the battery 4 is provided with a battery current sensor 42. The battery current sensor 42, which is a charging/discharging current detecting means, detects a charging/discharging current value Ix(A), which is the current value when the battery 4 is charged or discharged. The battery current sensor 42 is connected to the alternator ECU 6, and a charging/discharging current value Ix thus detected is output to the alternator ECU 6.

The engine ECU 5 controls the running of the engine 2. The engine ECU 5 outputs, for instance, an injection signal, an ignition signal, and a signal indicating the degree of valve opening, to the engine 2 based on the braking/driving force required for the vehicle 1, which force is set based on driver intention or is calculated in the automatic running control of the vehicle 1. In response to these output signals, the engine ECU 5 performs: fuel injection control, for example of the amount of fuel supplied to the engine 2 by a fuel injection valve, not illustrated, and for example of the timing of fuel injection; ignition control of an ignition plug, not illustrated; control of the degree of opening of a throttle valve, not illustrated, which is provided in an intake passage, not illustrated, of the engine 2. The engine ECU 5 is connected to the alternator ECU 6. Information based on the running state of the engine 2, such as the braking/driving force required, which has been input to the engine ECU 5, is output to the alternator ECU 6 as required. The hardware in the engine ECU 5 is composed of, for example: a Central Processing Unit (CPU)

that mainly performs processing; memories (e.g., RAM such as SRAM, and Read Only Memory (ROM) such as EEPROM) that store a program/programs and information; and an input/output interface. The configuration of the engine ECU 5 is the same as that of a known engine ECU, and a detailed explanation of it is, therefore, omitted here.

The alternator ECU 6 controls operation of the alternator 3. The alternator ECU 6 also monitors the charge status of the battery 4. The alternator ECU 6 also performs charging control and alternator braking/driving force control. As illustrated in FIG. 2, the alternator ECU 6 includes a charging controlling unit 61, an alternator braking/driving force controlling unit 62, an SOC value calculating unit 63, an SOC value correcting unit 64, and an alternator controlling unit 65. The configuration of the hardware in the alternator ECU 6 is substantially identical to that in the engine ECU 5, and a detailed explanation of it is, therefore, omitted here. Reference numeral 66 represents a storage unit that stores, for example, a target voltage setting map, which will be described later.

The charging controlling unit 61, which is a charging controlling means, causes the alternator 3 to generate power and performs charging control of the battery 4. The charging controlling unit 61 has a target voltage setting unit 61a, a charging target current value calculating unit 61b, and an accelerating/decelerating state determining unit 61c.

The target voltage setting unit 61a, which is a target voltage setting means, sets a target voltage $V^*(V)$ in the charging control. The target voltage setting unit 61a sets a target voltage $V^*$: based on the accelerating/decelerating state of the vehicle 1, which has been determined by the accelerating/decelerating state determining unit 61c (described below); and based on a value obtained by the SOC value correcting unit 64 that corrects the SOC value A (%) calculated by the SOC value calculating unit 63, that is, based on the corrected SOC value (hereinafter, simply referred to as "SOC correction value") B (%). Specifically, the target voltage setting unit 61a sets a target voltage $V^*$ based on the accelerating/decelerating state of the vehicle 1, an SOC correction value B, and a target voltage setting map stored in the storage unit 66.

As illustrated in FIG. 3, the target voltage setting map is a map based on the relation between the accelerating/decelerating state, SOC correction value B, and target voltage $V^*$. Accordingly, the target voltage $V^*$ can be set from the accelerating/decelerating state of the vehicle 1 and the SOC correction value B. In the target voltage setting map according to the embodiment, three target voltages $V^*$, i.e., LOW, MID, and HIGH, are set in advance. Their relation in terms of voltage magnitude is as follows: LOW<MID<HIGH. In addition, on the target voltage setting map, three states, i.e., under deceleration, under constant travel, and under acceleration, are set for the accelerating/decelerating state. On the target voltage setting map also, three levels, i.e., high, medium, and low, are set in advance for the charge status of the battery 4 according to the relation between the SOC correction value B and threshold values C and D. In this case, the threshold value C represents a value at which the SOC value A of the battery 4 is determined to be very high whereas the threshold value D represents a value at which the SOC value A of the battery 4 is determined to be very low. The relation, threshold value C>threshold value D, has thus been determined. A high charge status has an SOC correction value B equal to or greater than the threshold value C, a medium charge status has an SOC correction value B less than the threshold value C but greater than the threshold value D, and a low charge status has an SOC correction value B equal to or less than the threshold value D. On the target voltage setting map, when the vehicle 1 is under deceleration, the target voltage $V^*$ is set high, compared to cases where the vehicle 1 is under constant travel or under acceleration. Hence, charging of the battery 4 with power generated by the alternator 3 is rendered active. Conversely, on the target voltage setting map, when the vehicle 1 is under acceleration, the target voltage $V^*$ is set low, compared to cases where the vehicle 1 is under deceleration or under constant travel. Hence, charging of the battery 4 by power generated by the alternator 3 is rendered passive, thereby decreasing load produced due to power generation by the alternator 3. Accordingly, a decrease in braking/driving force (in this case, driving force) generated by the engine 2 is suppressed. On the target voltage setting map, where the charge status is high and the SOC value A of the battery 4 is very large, the battery 4 does not have to be actively charged, and the target voltage $V^*$ is, therefore, set low, compared to cases where the charge status is medium or low. Conversely, on the target voltage setting map, when the charge status is low and the SOC value A of the battery 4 is very low, the battery 4 has to be actively charged, and the target voltage $V^*$ is, therefore, set high, compared to the case where the level of charge status is high or medium. Incidentally, a high charge status can be a status in which the SOC correction value B exceeds the threshold value C, a medium charge status can be a status in which the SOC correction value B is equal to or less than the threshold value C but equal to or greater than the threshold value D, and a low charge status can be a status in which the SOC correction value B is less than the threshold value D.

The charging target current value calculating unit 61b, which is a charging target current value calculating means, calculates a charging target current value $1b(A)$. The charging target current value calculating unit 61b calculates a charging target current value 1b such that the difference between the target voltage $V^*$ obtained by the target voltage setting unit 61a and the battery voltage Vr detected by the battery voltage sensor 41 and output to the alternator ECU 6 is multiplied by the gain g used for converting a voltage value into a current value. The charging target current value 1b thus calculated by the charging target current value calculating unit 61b is output to the alternator controlling unit 65.

The accelerating/decelerating state determining unit 61c, which is an accelerating/decelerating state determining means, determines the accelerating/decelerating state of the vehicle 1. The accelerating/decelerating state determining unit 61c determines the accelerating/decelerating state of the vehicle 1 based on the sum Ft(N) of a required braking/driving force Fx(N) for the vehicle 1 and the alternator braking/driving force Fo(N). In the embodiment, based on the relation between the sum Ft and threshold values E and G, the accelerating/decelerating state determining unit 61c determines whether the vehicle 1 is "under acceleration", "under constant travel", or "under deceleration". Here, the threshold value E represents a value at which the vehicle 1 is determined to be under acceleration whereas the threshold value G is a value at which the vehicle 1 is determined to be under deceleration. The relation, threshold value E>threshold value G, has thus been determined. If the sum Ft is equal to or greater than the threshold value E, the accelerating/decelerating state determining unit 61c determines that the vehicle 1 is "under acceleration" (Ft≧E). If the sum Ft is less than the threshold value E but greater than the threshold value G, the accelerating/decelerating state determining unit 61c determines that the vehicle is "under constant travel" (E>Ft>G). If the sum Ft is equal to or less than the threshold value G, the accelerating/decelerating state determining unit 61c determines that the vehicle is "under deceleration" (G≧Ft). Accordingly, the accelerating/decelerating state determining unit 61c can determine the accelerating/decelerating state of the vehicle 1, taking account of not only a required braking/driving force Fx required for the vehicle 1 but also an alternator braking/driving force Fo that will be generated by the alternator 3 in future under alternator braking/driving force control. This enables charging to be controlled based on the future accelerating/decelerating state of the vehicle 1. Incidentally, if the sum Ft exceeds the threshold value E, the accelerating/decelerating state determining unit 61c may determine that the vehicle 1 is "under acceleration" (Ft>E). If the sum Ft is equal to or less than the threshold value E but equal to or greater than the threshold value G, the accelerating/decelerating state determining unit 61c may determine that the vehicle is "under constant travel" (E≧Ft≧G). If the sum Ft is less than the threshold value G, the accelerating/decelerating state determining unit 61c may determine that the vehicle is "under deceleration" (G>Ft).

The alternator braking/driving force controlling unit 62, which is an alternator braking/driving force controlling means, performs the alternator braking/driving force control such that an alternator braking/driving force Fo generated and applied to the vehicle 1 by the alternator 3 is controlled in accordance with the running state of the vehicle 1. That is, based on the running state of the vehicle, the alternator braking/driving force controlling unit 62 causes the alternator 3 to generate an alternator braking/driving force Fo and apply the generated alternator braking/driving force Fo to the vehicle 1. The alternator braking/driving force controlling unit 62 has an alternator braking/driving force setting unit 62a, an alternator target current value calculating unit 62b, and a phasing filter unit 62c.

The alternator braking/driving force setting unit 62a, which is an alternator braking/driving force setting means, sets an alternator braking/driving force Fo based on the running state of the vehicle 1. This alternator braking/driving force setting unit 62a sets an alternator braking/driving force Fo based on the running state of the vehicle 1, and, in particular, on the behavior, etc., of the vehicle 1. Specifically, the alternator braking/driving force setting unit 62a sets an alternator braking/driving force Fo, for example, in order to damp vibration, suppress changes in the pitch, roll, and yaw angles of the vehicle 1, and suppress any change in braking/driving force generated by the engine 2. The alternator braking/driving force setting unit 62a also sets an alternator braking/driving force Fx based on information output to the alternator ECU 6 from the engine ECU 5, such as a required braking/driving force Fo and the engine revolving speed, and also based on information detected and output to the alternator ECU 6 by the other sensors 12, such as the speed of each wheel, not illustrated, of the vehicle 1 and the attitude of the vehicle 1.

The alternator target current value calculating unit 62b, which is an alternator target current value calculating means, calculates an alternator target current value Io(A). The alternator target current value calculating unit 62b calculates an alternator target torque To(Nm) based on the alternator braking/driving force Fo set by the alternator braking/driving force setting unit 62a. Based on the calculated alternator target torque To, the alternator target current value calculating unit 62b calculates an alternator target current value Io. The alternator target current value Io calculated by the alternator target current value calculating unit 62b is output to the SOC value correcting unit 64, which will be described later. The alternator target current value Io calculated by the alternator target current value calculating unit 62b is output to the alternator controlling unit 65 via the phasing filter unit 62c, which will be described below.

The phasing filter unit 62c, or a phasing filter, controls the alternator braking/driving force based on an alternator target current value Io at a timing of actually applying an alternator braking/driving force Fo to the vehicle 1. The phasing filter unit 62c causes the alternator 3 to generate a set alternator braking/driving force Fo at a timing of actually applying an alternator braking/driving force Fo to the vehicle 1. In order to attempt this, the phasing filter unit 62c delays, based on the timing, the output of the alternator target current value Io to the alternator controlling unit 65. In this case, as described above, the alternator target current value Io has been calculated by the alternator target current value calculating unit 62b based on the alternator braking/driving force Fo set by the alternator braking/driving force setting unit 62a. The phasing filter unit 62c sets the delay based on a target alternator braking/driving force Fo set by the alternator braking/driving force setting unit 62a. The phasing filter unit 62c sets the delay to approximately 10 to 1000 ms. The delay set by the phasing filter unit 62c may be a constant value; alternatively, it may vary with the speed of the vehicle 1 (i.e., with the speed of each wheel, not illustrated, which has been detected by the other sensors 12).

The SOC value calculating unit 63 calculates the charge status of the battery 4. The SOC value calculating unit 63 calculates the charge rate of the battery 4, which is the charge status of the battery 4, based on the charging/discharging current value Ix that has been detected by the battery current sensor 42 and output to the alternator ECU 6. That is, the SOC value calculating unit 63 calculates an SOC value A (%). The SOC value calculating unit 63 calculates the SOC value A by dividing the time integral value of the detected charging/discharging current values Ix by the battery capacity K of the battery 4.

The SOC value correcting unit 64 is an SOC value correcting means. Based on an alternator braking/driving force Fo, the SOC value correcting unit 64 corrects an SOC value A calculated based on the charge status of the battery 4. This SOC value correcting unit 64 calculates an SOC correction value B in such a manner that an SOC value A calculated by the SOC value calculating unit 63 is corrected based on an alternator braking/driving force Fo calculated by the alternator braking/driving force setting unit 62a. The SOC value correcting unit 64 calculates the quantity Xo(Ah) of alternator generated electrical power, which is the time integral value of the alternator target current values Io calculated by the alternator target current value calculating unit 62b based on phasing carried out by the phasing filter unit 62c. The SOC value correcting unit 64 calculates an SOC gain G based on the calculated quantity Xo(Ah) of alternator generated electrical power, and corrects the SOC value A based on the calculated SOC gain G. The SOC value correcting unit 64 calculates an SOC gain G by dividing the calculated quantity Xo of alternator generated electrical power by the battery capacity K of the battery 4, and calculates an SOC correction value B by adding the thus calculated SOC gain G to the SOC value A. Accordingly, the SOC value correcting unit 64 corrects the SOC value A based on the quantity Xo of alternator generated electrical power of the alternator braking/driving force Fo that will be generated by the alternator 3 in future under alternator braking/driving force control. Thus, the SOC correction value B is obtained as a future SOC value for the vehicle 1. This enables the charging controlling unit 61 to control charging based on the future SOC value.

The alternator controlling unit 65 controls the alternator 3. This alternator controlling unit 65 controls the alternator 3 by increasing/decreasing field current for the alternator 3. The alternator controlling unit 65 increases/decreases field current for the alternator 3 based on the sum of a charging target current value Ib calculated by the charging target current value calculating unit 61b and an alternator target current value Io calculated by the alternator target current value calculating unit 62b. Accordingly, the charging controlling unit 61 performs the charging control of the battery 4 via the alternator controlling unit 65 based on a target voltage V* set by the target voltage setting unit 61a, that is, based on a charging target current value Ib calculated by the charging target current value calculating unit 61b. In addition, the alternator braking/driving force controlling unit 62 performs the alternator braking/driving force control based on the alternator target current value Io calculated by the alternator target current value calculating unit 62b.

Figure 4:
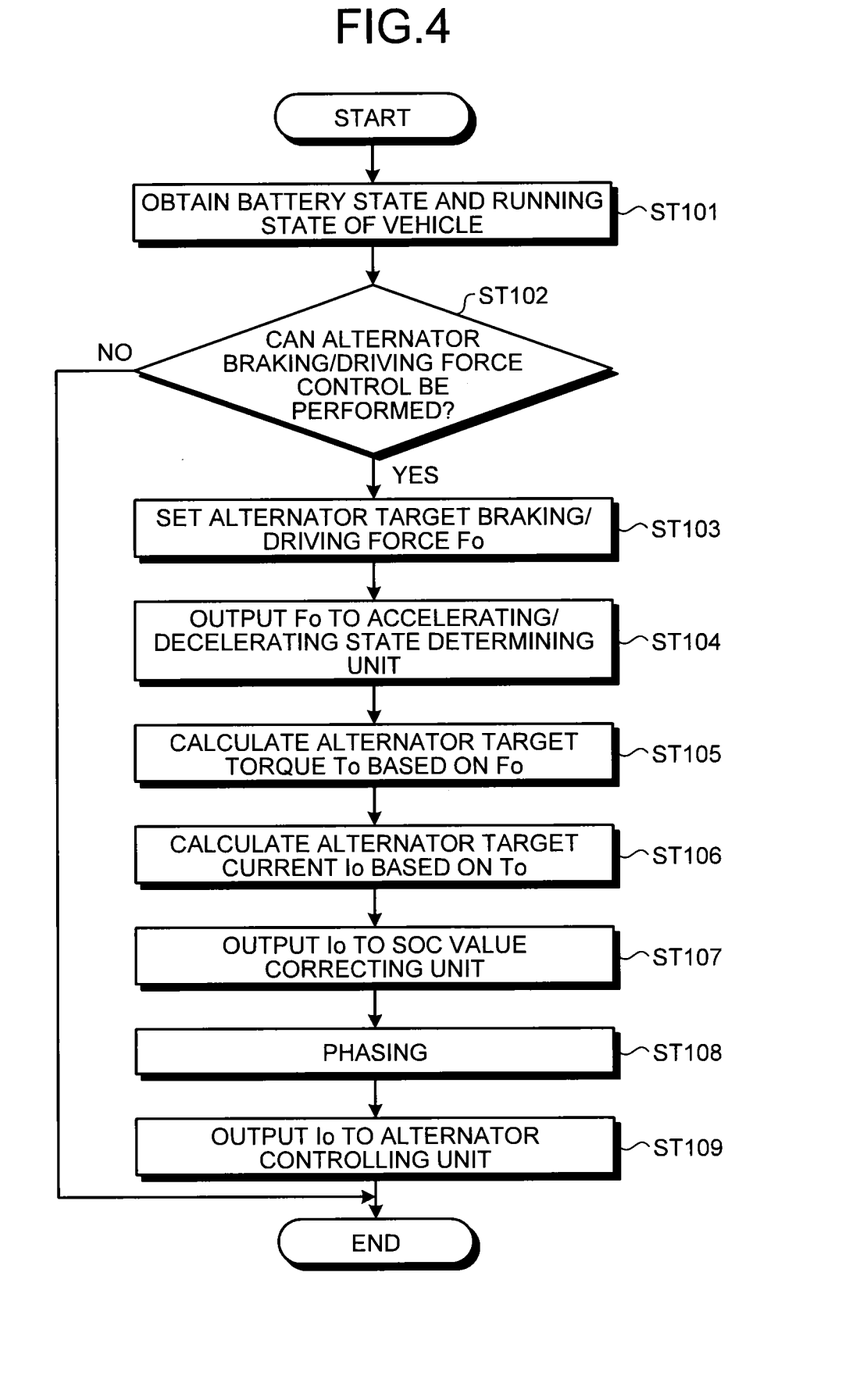
FIG. 4 is a flowchart of the operation of an alternator ECU in alternator braking/driving force control.
Figure 5:
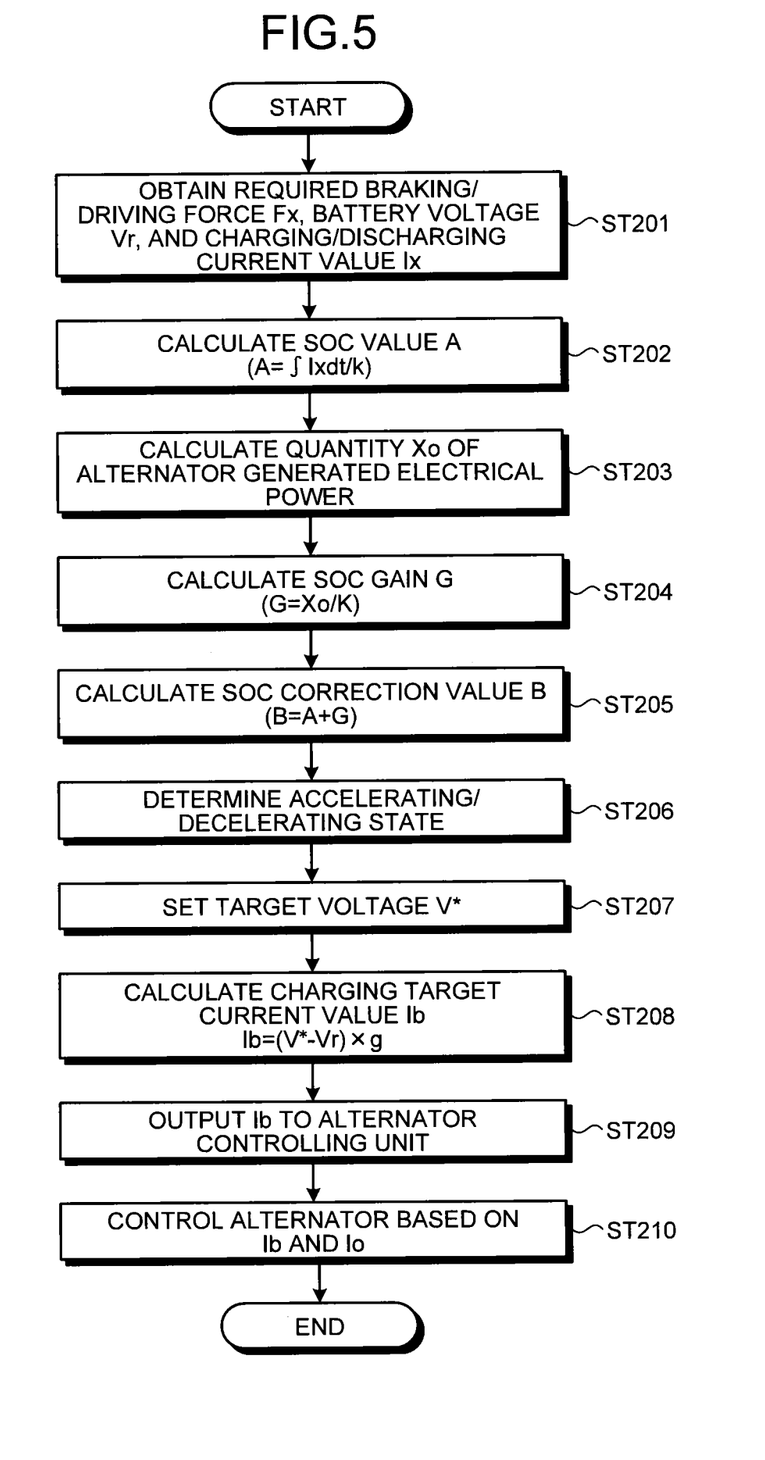
FIG. 5 is a flowchart of the operation of the alternator ECU in charging control.

Next, the operation of the alternator ECU 6 will be described. A description given below exemplifies an alternator controlling method involving the alternator ECU 6. In particular, a description is given of charging control of the battery 4, which is performed by the charging controlling unit 61 when the alternator 3 generates an alternator braking/driving force Fo by means the alternator braking/driving force controlling unit 62. FIG. 4 is a flowchart illustrating operation of the alternator ECU, which is performed under alternator braking/driving force control. FIG. 5 is a flowchart illustrating operation of the alternator ECU, which is performed under charging control.

First, operation of the alternator braking/driving force controlling unit 62 of the alternator ECU 6 will be described. As illustrated in FIG. 4, the alternator braking/driving force controlling unit 62 obtains the battery and running states of the vehicle 1 (step ST101). In this case, based on a charging/discharging current value Ix detected by the battery current sensor 42, an SOC value A calculated by the SOC value calculating unit 63 and the like, the alternator braking/driving force controlling unit 62 obtains the battery state such as the degree of deterioration, mode, and charge/discharge status of the battery 4. Additionally, the alternator braking/driving force controlling unit 62 obtains the running state of the vehicle 1 such as any changes in the pitch angle, roll angle, or yaw angle of the vehicle 1 and any change in braking/driving force generated by the engine 2. In this case, the alternator braking/driving force controlling unit 62 obtains the running state based on information output from the engine ECU 5 to the alternator ECU 6, such as the required braking/driving force Fx and engine revolving speed, and based on information detected and output to the alternator ECU 6 by the other sensors 12, such as the speed of each wheel, not illustrated, of the vehicle 1 and the attitude of the vehicle 1.

Next, the alternator braking/driving force controlling unit 62 determines whether alternator braking/driving force control can be performed based on the battery state (step ST102). In this case, if the battery 4 is deteriorated, in refresh mode, over-discharged state, or over-charged state, the alternator braking/driving force controlling unit 62 determines that alternator braking/driving force control cannot be performed (No, in step ST102). Accordingly, alternator braking/driving force control is not performed by the alternator braking/driving force controlling unit 62. Specifically, where the alternator braking/driving force control cannot be performed due to battery state or where charging control has priority, the alternator braking/driving force controlling unit 62 does not perform alternator braking/driving force control.

Subsequently, if a determination is made based on battery state that alternator braking/driving force control can be performed (Yes, in step ST102), the alternator braking/driving force setting unit 62a of the alternator braking/driving force controlling unit 62 sets an alternator braking/driving force Fo based on the running state of the vehicle 1 (step ST103). In this case, the alternator braking/driving force setting unit 62a sets an alternator braking/driving force Fo that can suppress a change in the pitch angle of the vehicle 1 when a determination is made from, for example, the speed of each wheel, not illustrated, of the vehicle 1, that the pitch angle may change in the future.

Next, the alternator braking/driving force controlling unit 62 outputs the alternator braking/driving force Fo set by the alternator braking/driving force setting unit 62a to the accelerating/decelerating state determining unit 61c of the charging controlling unit 61 (step ST104).

Next, the alternator target current value calculating unit 62b of the alternator braking/driving force controlling unit 62 calculates an alternator target torque To based on the alternator braking/driving force Fo set by the alternator braking/driving force setting unit 62a (step ST105).

Subsequently, the alternator target current value calculating unit 62b calculates an alternator target current value Io based on the calculated alternator target torque To (step ST106).

Subsequently, the alternator braking/driving force controlling unit 62 outputs the alternator target current value Io, calculated by the alternator target current value calculating unit 62b, to the SOC value correcting unit 64 (step ST107).

The phasing filter unit 62c of the alternator braking/driving force controlling unit 62 phases the alternator braking/driving force control (step ST108). The phasing filter unit 62c outputs the alternator target current value Io, which has been calculated by the alternator target current value calculating unit 62b, to the alternator controlling unit 65 at a timing of actually applying the alternator braking/driving force Fo to the vehicle 1; to accomplish this, the phasing filter unit 62c delays output of the alternator target current value Io to the alternator controlling unit 65 based on the timing. For example, where the alternator braking/driving force setting unit 62a sets an alternator braking/driving force Fo that can suppress changes in the pitch angle of the vehicle 1, the output of the alternator target current value Io to the alternator controlling unit 65 is delayed so that the alternator braking/driving force Fo set by the alternator 3 is generated so as to be timed to actual change in the pitch angle of the vehicle 1.

Next, the phasing filter unit 62c outputs the alternator target current value Io, calculated by the alternator target current value calculating unit 62b, to the alternator controlling unit 65 after phasing (step ST109).

Next, operation of the charging controlling unit 61 in the alternator ECU 6 will be described. As illustrated in FIG. 5, the charging controlling unit 61 obtains a required braking/driving force Fx, a battery voltage Vr, and a discharging/charging current value Ix (step ST201). In this case, the charging controlling unit 61 obtains the required braking/driving force Fx output to the alternator ECU 6 from the engine ECU 5, the battery voltage Vr detected by the battery voltage sensor 41 and output to the alternator ECU 6, and the charging/discharging current value Ix detected by the battery current sensor 42 and output to the alternator ECU 6.

Next, the SOC value calculating unit 63 of the alternator ECU 6 calculates an SOC value A (step ST202). In this case, the SOC value calculating unit 63 calculates an SOC value A by dividing the time integral of the obtained charging/discharging current values Ix by the battery capacity K of the battery 4.

Subsequently, the SOC value correcting unit 64 calculates the quantity Xo of alternator generated electrical power (step ST203). In this case, the SOC value correcting unit 64 calculates the quantity Xo of alternator generated electrical power equivalent to the time integral value of the alternator target current values Io calculated by the alternator target current value calculating unit 62b based on phasing carried out by the phasing filter unit 62c.

Next, the SOC value correcting unit 64 calculates an SOC gain G based on the calculated quantity Xo of alternator generated electrical power (step ST204). In this case, the SOC value correcting unit 64 calculates the SOC gain G by dividing the calculated quantity Xo of alternator generated electrical power by the battery capacity K of the battery 4 (G=Xo/K).

Subsequently, the SOC value correcting unit 64 calculates an SOC correction value B based on the calculated SOC gain G (step ST205). In this case, the SOC value correcting unit 64 calculates an SOC correction value B by adding the thus calculated SOC gain G to the SOC value A, (B=A+G). The SOC value correcting unit 64 outputs the calculated SOC correction value B to the target voltage setting unit 61a.

Next, the accelerating/decelerating state determining unit 61c of the charging controlling unit 61 determines the accelerating/decelerating state (step S206). In this case, based on the sum Ft of the obtained required braking/driving force Fx and the alternator braking/driving force Fo output from the alternator braking/driving force controlling unit 62 to the accelerating/decelerating state determining unit 61c, the accelerating/decelerating state determining unit 61c determines whether the vehicle 1 is "under acceleration", "under constant travel", or "under deceleration".

Next, the target voltage setting unit 61a of the charging controlling unit 61 sets a target voltage V* (step ST207). In this case, the target voltage setting unit 61a sets a target voltage V* based on the accelerating/decelerating state of the vehicle 1, which has been determined by the accelerating/decelerating state determining unit 61c, the SOC correction value B output from the SOC value correcting unit 64, and the target voltage setting map.

Next, the charging target current value calculating unit 61b of the charging controlling unit 61 calculates a charging target current value Ib (step ST208). The charging target current value calculating unit 61b calculates a charging target current value Ib such that the difference between the target voltage V* set by the target voltage setting unit 61a and the obtained battery voltage Vr is multiplied by gain g, (Ib=(V*−Vr)×g).

Subsequently, the charging target current value calculating unit 61b outputs the calculated charging target current value Ib to the alternator controlling unit 65 (step ST209).

Next, the alternator controlling unit 65 of the alternator ECU 6 controls the alternator 3 based on the charging target current value Ib calculated by the charging controlling unit 61 and alternator target current value Io calculated by the alternator braking/driving force controlling unit 62 (step ST210). In this case, the alternator controlling unit 65 increases/decreases a field current for the alternator 3 based on the sum of the charging target current value Ib and alternator target current value Io. Consequently, the alternator 3 generates power based on the set target voltage V* and hence generates the set alternator braking/driving force Fo. Accordingly, the alternator ECU 6 controls the alternator 3, thereby controlling the charging of the battery 4 and alternator braking/driving force.

As described above, when performing the alternator braking/driving force control while controlling charging of the battery 4, the alternator ECU 6 according to the embodiment corrects the SOC value A corresponding to the charge status of the battery 4 based on the alternator braking/driving force Fo. For example, where the charging control is performed based on the set target voltage V*, the target voltage V* is set according to the accelerating/decelerating state of the vehicle 1 and to the SOC correction value B, i.e., the corrected SOC value. Accordingly, even if the alternator 3 generates an alternator braking/driving force Fo under alternator braking/driving force control, the charging control of the battery 4 can be performed taking account of the generated alternator braking/driving force Fo. Accordingly, energy produced by power generated by the alternator 3 can be efficiently recovered taking account of alternator braking/driving force control.

In the foregoing embodiment, the alternator braking/driving force controlling unit 62 performs the alternator braking/driving force control based on only the alternator target current value Io calculated by the alternator target current value calculating unit 62b based on the alternator braking/driving force Fo set by the alternator braking/driving force setting unit 62a. However, the present invention is not limited to this. The alternator braking/driving force controlling unit 62 may perform alternator braking/driving force control according to the alternator target current value Io calculated based on a pre-stored alternator target torque Fo output from the alternator braking/driving force controlling unit 62. In this case, a navigation system, not illustrated, is provided as a current location detecting means, which detects the current location of the vehicle 1. This navigation system is connected to the alternator ECU 6. In addition, a storage unit, not illustrated, in the navigation system functions as a storage means for storing the alternator target current value Io, which has been calculated based on the alternator target torque Fo, so as to correspond to the current location. The storage unit, not illustrated, in the navigation system stores the relation between the current location of the vehicle 1 detected by the navigation system and the alternator target current value Io calculated at the current location based on the alternator target torque Fo. If the vehicle 1 passes through the stored current location, the alternator braking/driving force controlling unit 62 performs alternator braking/driving force control based on the alternator target current value Io, which is stored in the storage unit of the navigation system, so as to correspond to the current location. The storage means that stores the alternator target current value Io so as to correspond to the current location may be the storage unit 66 of the alternator ECU 6.

Specifically, for example, each time the vehicle 1 runs for a predetermined distance (e.g., 10 m), the storage unit of the navigation system, not illustrated, stores an alternator current integral value associated with the current location detected by the navigation system, the alternator current integral value being obtained by integrating alternator target current values Io calculated by the alternator target current value calculating unit 62b. If the vehicle 1 passes through the current location corresponding to the alternator current integral value stored in the storage unit of the navigation system, the alternator target current value calculating unit 62b performs alternator braking/driving force control using, as the alternator target current value Io, the alternator current integral value corresponding to the current location. Incidentally, where it is determined that the vehicle 1 is passing through the stored current location, the alternator target current value calculating unit 62b may perform, based on the speed of the vehicle 1, alternator braking/driving force control using, as the alternator target current value Io, the alternator current integral value corresponding to this current location. In this case, the phasing filter unit 62c changes the delay based on the speed of the vehicle 1.

INDUSTRIAL APPLICABILITY

As mentioned above, the alternator controlling apparatus and the alternator controlling method are useful for an alternator controlling apparatus and an alternator controlling method that perform battery charging control and alternator braking/driving force control, in which an alternator braking/driving force applied to a vehicle is controlled. In particular, they are effective in efficiently recovering energy produced during power generation by the alternator, taking account of alternator braking/driving force control.

The invention claimed is:

1. An alternator controlling apparatus comprising:
    a charging controlling unit that causes an alternator mounted in a vehicle to generate electrical power and performs charging control of a battery;
    an alternator braking/driving force controlling unit that performs alternator braking/driving force control such that an alternator braking/driving force generated by the alternator and applied to the vehicle is controlled based on a running state of the vehicle; and
    an SOC value correcting unit that corrects an SOC value corresponding to a charge state of the battery based on the alternator braking/driving force,
    wherein the charging controlling unit has an accelerating state determining unit that determines an accelerating/decelerating state of the vehicle based on a sum of a braking/driving force required for the vehicle and the alternator braking/driving force.

2. The alternator controlling apparatus according to claim 1, wherein
    the charging controlling unit has a target voltage setting unit that sets a target voltage in the charging control based on an accelerating/decelerating state of the vehicle and the corrected SOC value, and
    the charging controlling unit performs the charging control based on the set target voltage.

3. The alternator controlling apparatus according to claim 2, further comprising:
    a battery voltage detecting unit that detects a voltage of the battery, wherein
    the charging controlling unit has a charging target current value calculating unit that calculates a charging target current value based on a difference between the target voltage and the detected battery voltage, and the charging controlling unit performs the charging control based on the calculated charging target current value,
    the alternator braking/driving force controlling unit has an alternator braking/driving force setting unit that sets the alternator braking/driving force based on the running state of the vehicle, and an alternator target current value calculating unit that calculates an alternator target current value based on the set alternator braking/driving force, and the alternator braking/driving force controlling unit performs the alternator braking/driving force control based on the calculated alternator target current value, and
    the SOC value correcting unit corrects the SOC value based on the alternator target current value.

4. The alternator controlling apparatus according to claim 1, further comprising:
    a battery voltage detecting unit that detects a voltage of the battery, wherein
    the charging controlling unit has a charging target current value calculating unit that calculates a charging target current value based on a difference between the target voltage and the detected battery voltage, and the charging controlling unit performs the charging control based on the calculated charging target current value,
    the alternator braking/driving force controlling unit has an alternator braking/driving force setting unit that sets the alternator braking/driving force based on the running state of the vehicle, and an alternator target current value calculating unit that calculates an alternator target current value based on the set alternator braking/driving force, and the alternator braking/driving force controlling unit performs the alternator braking/driving force control based on the calculated alternator target current value, and
    the SOC value correcting unit corrects the SOC value based on the alternator target current value.

5. The alternator controlling apparatus according to claim 4, wherein
    the alternator braking/driving force controlling unit has a phasing filter that performs a alternator braking/driving force control based on the alternator target current value at a timing of actually applying the alternator braking/driving force to the vehicle, and
    the SOC value correcting unit calculates an SOC gain based on a quantity of alternator generated electrical power that corresponds to a time integral value of the alternator target current values, based on phasing carried out by the phasing filter, and corrects the SOC value based on the calculated SOC gain.

6. The alternator controlling apparatus according to claim 5, further comprising:
    a current location detecting unit that detects the current location of the vehicle;
    an alternator current detecting unit that detects an alternator current value of the alternator; and
    a storage unit that stores the detected alternator current value and the current location such that the detected alternator current value and the current location are correspond to each other, wherein
    the braking/driving force controlling unit performs the alternator braking/driving force control such that when the vehicle passes through the stored current location, the alternator current value stored corresponding to the current location is used as a target current value.

7. The alternator controlling apparatus according to claim 4, further comprising:
    a current location detecting unit that detects the current location of the vehicle;
    an alternator current detecting unit that detects an alternator current value of the alternator; and
    a storage unit that stores the detected alternator current value and the current location such that the detected alternator current value and the current location are correspond to each other, wherein
    the braking/driving force controlling unit performs the alternator braking/driving force control such that when the vehicle passes through the stored current location, the alternator current value stored corresponding to the current location is used as a target current value.

8. The alternator controlling apparatus according to claim 1, further comprising:
    a current location detecting unit that detects the current location of the vehicle;
    an alternator current detecting unit that detects an alternator current value of the alternator; and a storage unit that stores the detected alternator current value and the current location such that the detected alternator current value and the current location are correspond to each other, wherein the braking/driving force controlling unit performs the alternator braking/driving force control such that when the vehicle passes through the stored current location, the alternator current value stored corresponding to the current location is used as a target current value.

9. An alternator controlling method comprising:

performing an alternator braking/driving force control such that alternator braking/driving force generated by an alternator mounted in a vehicle and applied to the vehicle is controlled based on a running state of the vehicle;

calculating an SOC value based on a charge status of a battery;

calculating a quantity of alternator generated electrical power that corresponds to a time integral value of the alternator target current values based on phasing carried out by the phasing filter, calculating an SOC gain based on the calculated quantity of alternator generated electrical power, and correcting the SOC value based on the calculated SOC gain;

setting a target voltage based on an accelerating/decelerating state of the vehicle and the corrected SOC value; and performing the battery charging control such that the alternator is caused to generate electrical power based on the set target voltage.

\* \* \* \* \*